United States Patent

Bleckmann et al.

[11] Patent Number: 5,193,887
[45] Date of Patent: Mar. 16, 1993

[54] CIRCUIT CONFIGURATION FOR AN ANTI-LOCK-CONTROLLED BRAKE SYSTEM

[75] Inventors: Hans-Wilhelm Bleckmann, Bad Nauheim; Heinz Loreck, Frankfurt am Main; Michael Zydek, Langgoens/Cleeberg; Hermann Esselbruegge, Weiterstadt, all of Fed. Rep. of Germany

[73] Assignee: Alfred Teves GmbH, Frankfurt am Main, Fed. Rep. of Germany

[21] Appl. No.: 655,515

[22] Filed: Feb. 14, 1991

[30] Foreign Application Priority Data

Feb. 16, 1990 [DE] Fed. Rep. of Germany ....... 4004782

[51] Int. Cl.$^5$ .............................. B60T 8/32; B60T 8/60
[52] U.S. Cl. .................................. 303/92; 188/181 C; 303/103; 364/426.02; 364/426.03
[58] Field of Search ............... 303/92, 102, 103, 91, 303/110, 95, 96, 106-109; 364/426.01, 426.02, 426.03, 424.03, 518; 188/181 C, 181 A, 181 R; 73/121; 361/160

[56] References Cited

U.S. PATENT DOCUMENTS

| 3,874,743 | 4/1975 | Fleischer et al. | |
|---|---|---|---|
| 4,092,853 | 6/1978 | Schneider et al. | 303/92 X |
| 4,493,210 | 1/1985 | Fries et al. | 303/92 X |
| 4,546,437 | 10/1985 | Bleckmann et al. | 303/92 X |
| 4,709,341 | 11/1987 | Matsuda | 364/424.03 X |
| 4,773,072 | 9/1988 | Fennel | 303/92 X |
| 4,917,443 | 4/1990 | Kramer et al. | 303/92 |

FOREIGN PATENT DOCUMENTS

| 2928981 | 2/1981 | Fed. Rep. of Germany . |
|---|---|---|
| 3126102 | 1/1983 | Fed. Rep. of Germany . |
| 3234637 | 3/1984 | Fed. Rep. of Germany . |
| 3924988 | 1/1991 | Fed. Rep. of Germany . |
| 3925418 | 2/1991 | Fed. Rep. of Germany . |

Primary Examiner—Douglas C. Butler
Attorney, Agent, or Firm—Robert P. Seitter; J. Gordon Lewis

[57] ABSTRACT

This is a circuit configuration provided for an anti-lock-controlled brake system and serving for processing sensor signals obtained by wheel sensors (5) and for generating braking pressure control signals. This circuit configuration contains two microcontrollers (1, 2) interconnected by data exchange lines (7). The handled signals are concurrently processed by the microcontrollers independently of one another and the exchanged signals are checked for consistency. A deviation of the exchanged signals which is due to malfunctions is signalized to a safety circuit (8) which, thereupon, interrupts the power supply to the solenoid valves (L1 ... Ln). The monitoring signal (WD1, WD2) fed to the safety circuit (8) is a predetermined alternating signal in case of consistency of the exchanged signals and in case of proper operation of the circuit configuration. The safety circuit (8) compares the alternating signal with a time standard derived from a clock generator (TG2, TG3) which is independent of the operating cycle (TG1) of the microcontrollers (1,2). A change in the alternating signal, as well as a failure in the time standard, causes a cut-off of power supply and, hence, of anti-lock control.

10 Claims, 2 Drawing Sheets

CIRCUIT CONFIGURATION FOR AN ANTI-LOCK-CONTROLLED BRAKE SYSTEM

INTRODUCTION

This invention relates to a circuit configuration for an anti-lock-controlled brake system, which circuit configuration serves for processing sensor signals that have been obtained by means of wheel sensors and that represent the rotational behavior of the vehicle wheels and for generating braking pressure control signals by means of which solenoid valves inserted into the brake lines can be changed over, and which circuit configuration is provided with two or more microcontrollers that are interconnected by data exchange lines and can be fed with the sensor signals after the same have been handled in a trigger circuit, with the microcontrollers independently of one another processing the sensor signals, generating the braking pressure control signals, checking the exchanged signals for consistency and feeding a monitoring signal to a safety circuit which interrupts the power supply to the solenoid valves in case of malfunctions.

BACKGROUND OF THE INVENTION

Such a circuit configuration has come to knowledge from German Published Patent Application (DE-OS) No. 3234637. The handled signals of all wheel sensors are fed concurrently to two electronic circuits and are there processed by means of identical logic or rather in accordance with identical programs for the purpose of identifying malfunctions of the electronic circuitry. The signals available at different points in the course of the program are exchanged and checked for consistency. Any deviations are an indication of malfunctions wherefore in such a case either of the two electronic circuits signalizes this malfunction to one or several safety circuits. This causes a cut-off of the power supply to the solenoid valves serving for anti-lock control. As, in their rest positions, the solenoid valves do not influence the pressure medium supply to the brake and, hence, the brake application, nor permit any pressure removal via the outlet valves it is ensured that the vehicle will continue to be able to be braked, although without anti-lock control, in case of a trouble in the electronic system.

BRIEF DESCRIPTION OF THE INVENTION

However, in such a circuitry it is conceivable, although unlikely, that there are cases where anti-lock control will remain switched on despite a malfunction. Therefore, it is an object of the present invention to enhance the degree of safety even more, with which anti-lock control will be switched off in case of a trouble in the electronic or electric system, and thus to increase the safety of maintaining the braking operation, although without control. This object ought to be achieved without any additional expense or with very little additional expense at the maximum.

It has been found out that this object can be solved in a circuit configuration of the type referred to at the beginning in that, in case of consistency of the exchanged signals and in case of proper operation of the circuitry, the monitoring signal of each microcontroller is a predetermined alternating signal, i.e., an alternating signal with predetermined frequency and with predetermined variation; and in that the safety circuit compares the monitoring signal, or rather the alternating signal, with a time standard derived from one or several clock generators which are independent of the operating cycle of the microcontrollers.

According to this invention, the enhanced safety will thus be achieved in that an alternating is selected as monitoring signal by means of which each microcontroller signalized the proper condition to the safety circuit; and in that this alternating signal is compared with a time standard. The alternating signal, for instance, is a pulse sequence of predetermined duration and frequency. Moreover, a time standard, or rather a time window, is used for the monitoring signal of each microcontroller. Said time standard, or rather time window, is gained independently of the operating cycle of the microcontrollers by means of additional clock generators. These clock generators may be of simple construction as they only have to check relatively roughly whether the monitoring signal falls into the predetermined time window. Such clock generators, for instance, permit integration at low expense into the trigger circuit provided for the wheel sensor signals.

Should there be a failure of the clock generators defining the time windows this would also lead to a cut-off of anti-lock control. Thus the monitoring assemblies are also included in the monitoring operation.

According to one advantageous embodiment of this invention, the monitoring signal of each microcontroller is compared with the time window derived from a specific clock generator. As compared with the use of a common clock generator this will once more enhance the safety degree of error detection.

It will be an advantage if, upon error detection, the safety circuit interrupts the power supply path of a relay via the operating contact of which power supply to the solenoid valves takes place. A very expedient embodiment of such a circuit configuration for actuating the power supply relay is described in the German Patent Application No. P 39 24 988.3. If such a circuit configuration is used it will be ensured that power supply will be interrupted even in case of troubles of various types within the relay actuation system.

A further very advantageous embodiment of this invention consists in that, upon error detection, the safety circuit actuates semiconductor stages such as transistor stages via an additional signal output which block the actuation of the solenoid valves, e.g., by interrupting power supply to the driver stages, or rather amplifier stages, connected upstream of the solenoid valves. In this way, any further anti-lock control will be prevented even if the detected trouble admittedly will cause the safety circuit to respond, with the supply voltage, however, not being switched off because of a bridged switching contact, for instance.

According to a further embodiment of this invention, the microcontrollers will not only signalize defective operation if the mutually exchanged signals are not consistent but also if there appear signals or signal combinations which will not be possible in case of proper operation of the anti-lock control system. Monitoring thus also takes place in accordance with so-called plausibility criteria.

According to another favorable example of an embodiment of this invention, the output signal of a monitoring circuit is feedable to the microcontrollers, the error detection state of said output signal—e.g., a permanent signal instead of an alternating signal—being signalizable as malfunction to the safety circuit by means of the microcontrollers and of the monitoring signals. The output signal, for instance, may be an output signal of a parity chain monitoring the operation of the solenoid valves. A very advanced monitoring circuit of this type is described in German Patent Application No. P39 25 418.8.

Further characteristics, advantages and applications of this invention will become evident from the following description of one example of an embodiment, reference being made to the accompanying drawing.

DETAILED DESCRIPTION OF THE PREFERRED EMBODIMENT

Figure 1:
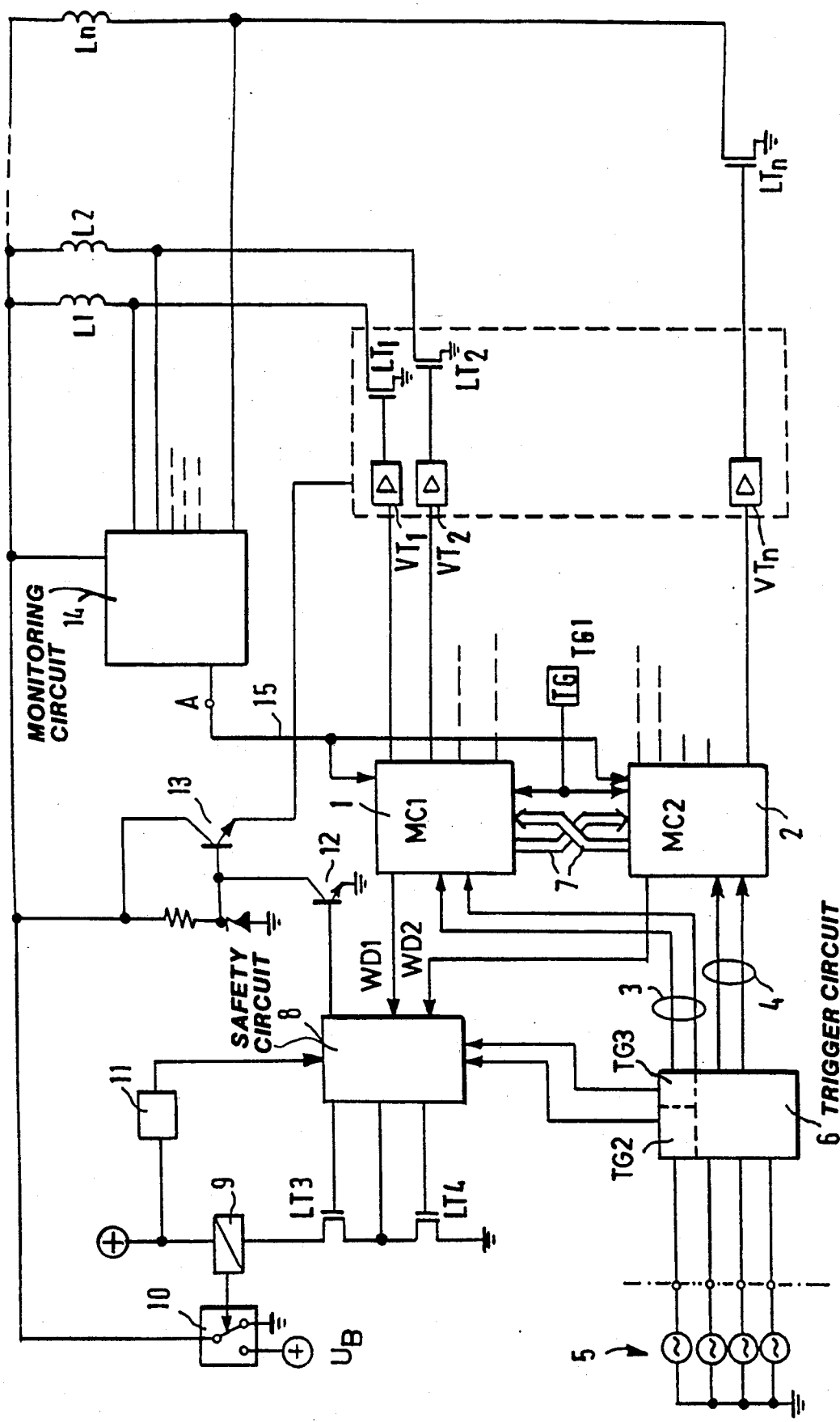
FIG. 1, is a block diagram showing the essential components of a circuit configuration in accordance with this invention.

In accordance with FIG. 1, the essential components of a circuit configuration for an anti-lock-controlled brake system are two microcontrollers 1,2 (MC1 and MC2) which, via signal lines 3, 4, are fed with the information on the rotational behavior of the individual vehicle wheels and which generate braking pressure control signals after these signals have been logically linked and handled.

The wheel information are obtained in the known manner by means of wheel sensors 5 whose signals are processed in a trigger circuit 6 and, subsequently, are passed on to the microcontrollers 1, 2. In the illustrated example of an embodiment, via lines 3 and 4, respectively, each microcontroller is fed the information of two wheel sensors out of the four wheel sensors; however, via the data exchange lines 7, the wheel information are also exchanged so that, independently of each other, in both microcontrollers it will be possible to derive braking pressure control signals from the input information, with the same program being used.

The output signals of the microcontrollers 1, 2 serve as braking pressure control signals. After amplification in valve drivers VT1, VT2 . . . VTn, said output signals will be fed to power transistors LT1, LT2, . . . LTn which directly actuate solenoid valves. The excitation coils of the solenoid valves are referred to by L1, L2 . . . Ln. The (non-illustrated) solenoid valves serve for braking pressure modulation within the scope of anti-lock control. In the rest position said solenoid valves do not have any influence on the braking operations.

The braking pressure control signals are likewise generated independently of one another in both microcontrollers 1, 2, and are compared via data exchange lines 7. In the illustrated example of an embodiment, the connections to the individual solenoid valves are distributed to the two microcontrollers 1, 2 because of the limited number of the available outputs, or rather connection pins.

Monitoring lines WD1, WD2 lead from the microcontrollers 1, 2 to a safety circuit 8. Via outputs of said safety circuit 8, two power transistors LT3, LT4 are actuated that are connected in series and via which a power supply relay, or rather a main relay 9, is energized which, via an operating contact 10, maintains the power supply to the solenoid valve and their actuation circuits (VT1 . . . VTn). A circuit 11 serves for the voltage supply UB of the safety circuit 8 and for triggering a reset pulse.

A further output of the safety circuit 8 leads to two cascade-connected transistors 12, 13. In case of proper operation, transistor 13 is conductive and supplies the valve drivers VT1, VT2 . . . VTn as well as the power transistors LT1, LT2 . . . LTn with energy. Power supply to the valve drivers and power transistors will be blocked via transistor 13 if transistor 12 is actuated by safety circuit 8.

A monitoring circuit 14 to be explained in more detail in the following with reference to FIG. 2 supplies a signal to the two microcontrollers 1, 2 via a line 15. In a certain way, said signal will be dependent on the correction signals of the microcontrollers 1, 2, or rather on the actuation of the solenoid valves L1 . . . Ln, as long as the monitored elements and windings L1, L2 . . . Ln are in good order. If a trouble comes up the signal at output A will deviate from the "expected" signal.

A clock generator TG1 is provided for the generation of an operating cycle for the microcontrollers 1, 2, its clock frequency being determined by a quartz. The operating cycle of the microcontrollers 1, 2 also determines the frequency and the shape of the monitoring signals WD1, WD2 that signalize intact condition and proper operation to the safety circuit. In one example of an embodiment of this invention, the monitoring signals WD1, WD have the shape of short pulses of a duration of 200/us which are repeated every 7 ms.

Two further clock generators TG2, TG3 which are independent of clock generator TG1 are provided for the generation of time windows or time standards by means of which the monitoring signals are comparable. In the present example, said clock generators TG2, TG3 are integrated into the trigger circuit 6.

Monitoring of the circuit configuration as per FIG. 1 will be performed as follows:

The two microcontrollers 1, 2 contain circuits that permanently perform a consistency check of the signals exchanged via the data exchange lines 7. Moreover, in a manner known per se, it is established within the circuits 1, 2 whether predetermined plausibility criteria are complied with, or rather whether the signals formed within the scope of signal processing will be possible in case of intact circuitry and proper operation. Finally, it is also checked whether an alternating signal is actually available at output A of the monitoring circuit 14, or rather at the corresponding inputs which are given access to by line 15. If all these conditions are complied with independently of one another in either of the microcontrollers 1, 2 this will be signalized to the safety circuit 8 by means of the monitoring signals WD1, WD2 which, in this case, represent an alternating signal of a certain shape and frequency such as a pulse sequence of a certain frequency.

The two monitoring signals WD1, WD2 are compared independently of each other with corresponding time standards derived from the clock generators TG2, TG3. As long as there is no deviation indicating a trouble or a malfunction the power transistor LT3, LT4 connected to the corresponding outputs of the safety circuit 8 can be activated, the relay 9 remaining switched on. The voltage UB is applied to the illustrated circuit and to the solenoid valves. There is no signal at the third output of the safety circuit 8, which leads to transistor 12, so that also the valve drivers and the power transistors are connected to the battery voltage UB via transistor 13.

If now there occurs a malfunction detected by the monitoring circuit 14 and/or by the microcontroller 1 and/or 2 this will lead to a corresponding change in the monitoring signal WD1 and/or WD2. The safety circuit 8 will react by ending actuation of transistors LT3, LT4, thereby causing relay 9 to drop out and interrupting the power supply to the entire circuitry. Additionally, the power supply to valve drivers VT1 . . . VTn and to power transistors LT1 . . . Ltn will be blocked in the described way via the third output of the safety circuit 8. This, however, will only be of importance if cut-off via relay 9 does not work or is delayed.

A corresponding reaction of safety circuit 8 will also come about if one or both monitoring signals WD1, WD2 are no longer consistent with the time standards derived from the clock generators TG2, TG3 or if either clock generator TG2, TG3 becomes defective, with the monitoring signals WD1, WD2 being intact. Consequently, the monitoring elements themselves are monitored.

Figure 2:
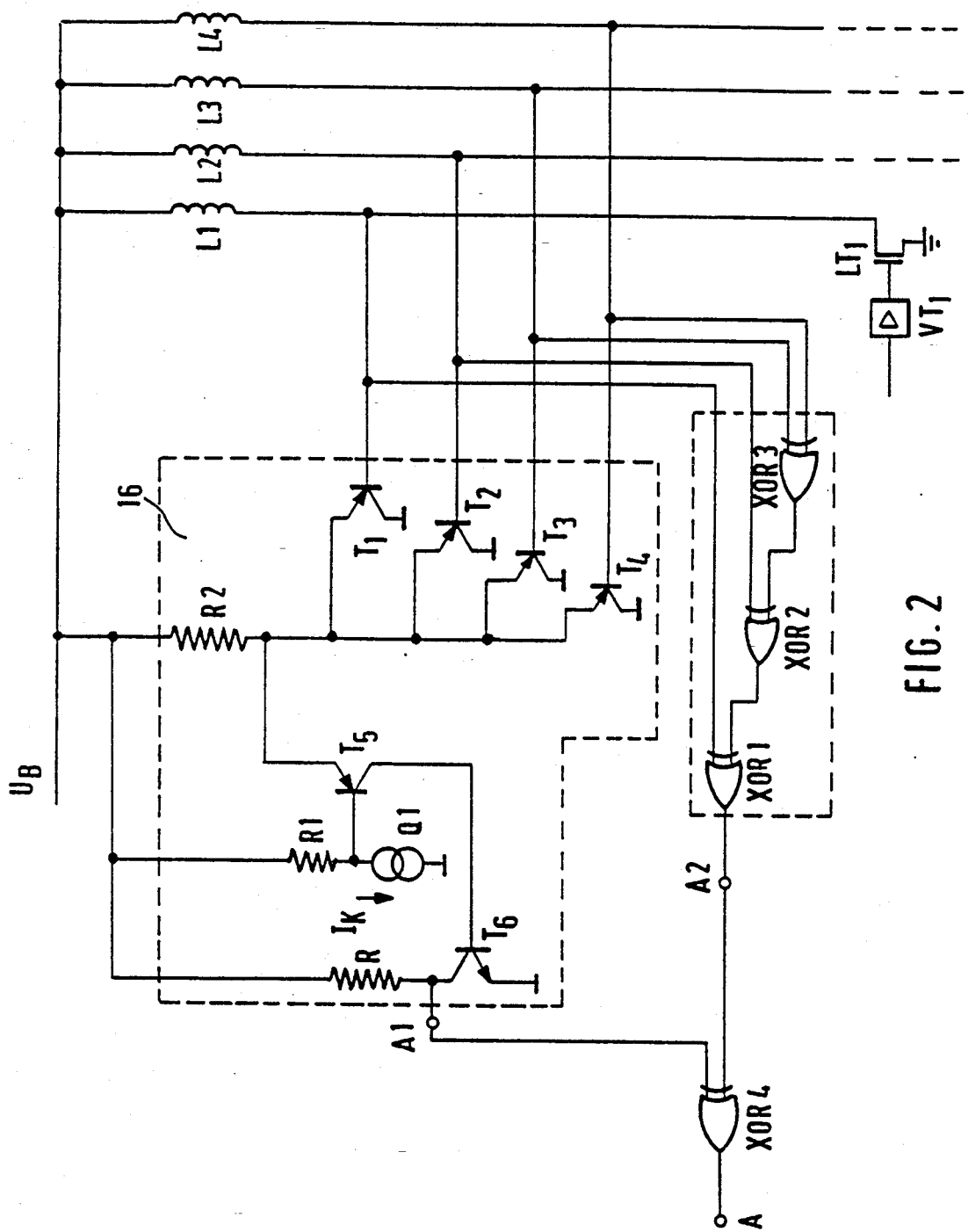
FIG. 2, shows details of one component of the circuit configuration as per FIG. 1.

FIG. 2, referring to an example of an embodiment with four solenoid valves whose excitation windings are referred to by L1-L4, serves to explain the connection and mode of operation of the monitoring circuit 14 of FIG. 1. This circuit is described in detail in Patent Application No. P 39 25 418.8 mentioned at the beginning.

The signal at output A, or rather on line 15, is dependent on the signal variation, or rather on the signal distribution, at all the outputs of the microcontrollers 1, 2 that are connected via the monitoring circuit 14. For instance, a change in the signal level at any one of the outputs of the microcontrollers 1, 2 with the levels at the remaining outputs staying the same, automatically will cause a change in level on line 15. In the microcontrollers 1, 2 it will always be checked whether the signal at the output of monitoring circuit 14 will be in conformity with the signal distribution at the outputs of the microcontrollers 1, 2.

The transistors T1-T4 of the monitoring circuit 14, together with the remaining components combined in circuit block 16, form an OR-link whose output signal is formed by means of transistors T5, T6 and is available at an output A1. Connected at the base of transistor T5 are a current source Q1 towards the ground and an ohmic resistor R1 towards the supply voltage UB. The emitter of transistor T5 is connected with the battery UB via a low-impedance resistor R2. The current source Q1, the base resistor R1 and the emitter resistor R2 are dimensioned such as to ensure that, as long as the transistors T1-T4 are non-conductive, the two transistors T5 and T6 will carry a current so that there will prevail the signal state L (low) at output A1.

There will be a change in the level at output A1 if at least one valve is excited, or rather if one of transistors LT1 . . . LTn is actuated (in FIG.2 only LT1 and the appertaining driver stage VT1 are sketched out).

As long as the power transistors are not actuated the transistors T1-T4 will be non-conductive as each transistor base, which in each case is connected to the battery voltage UB via one of the low-impedance windings L1-L4, is on the potential of the voltage source UB. The current flowing via R2 and the transistors T5, T6 will cause a drop in voltage in the blocking direction of the base-emitter diode of transistors T1-T4.

The base connections of transistors T1-T4 are connected to one output A2 by means of non-equivalent elements XOR1, XOR2, XOR3 (exclusive OR). Each of said non-equivalent elements has two inputs and one output and they are combined into a so-called parity chain in that in each case a control connection of a valve excitation winding is linked with the output a signal of a non-equivalent element. In the illustrated manner, it is possible to connect any number of solenoid valves, or rather of valve excitation windings, to one output A.

The OR-link 16 also reacts to leakage currents via the windings L1-L4. As the drop in voltage on the low-impedance resistor R2 is small, a relatively small leakage current flowing via any one of the windings will already cause the corresponding transistor T1-T4 to become current-carrying, thereby the drop in voltage on R2 being increased that much as to cause T5 and, hence, also T6 to become non-conductive. This again is detectable by means of a signal change at output A1 of the OR-link and, thus, at output A of the monitoring circuit, also.

Consequently, a certain signal variation at the output of the monitoring circuit 14 will correspond to the signal variation at the power transistors LT1, LT2 through LTn, or rather at the outputs of the microcontrollers 1, 2 (FIG. 1). The defect of any power transistor LT1 . . . LTn, an excessive saturation voltage, a short circuit or the like are consequently detectable by means of the monitoring circuit 14.

What is claimed is:

1. A circuit for controlling a vehicle anti-lock system operative to receive wheel condition signals from a plurality of wheel condition sensors and generate brake pressure signals in response thereto to modulate vehicle brake line solenoid valves, said circuit comprising:

first microcontroller means and second microcontroller means interconnected by data exchange lines.

(a) said first microcontroller means for:
  (1) receiving selected ones of said wheel condition signals,
  (2) independently processing said wheel condition signals received by said first microcontroller means,
  (3) generating said brake pressure signals in response to said wheel condition signals received by said first microcontroller means, (b) said second microcontroller means for:
  (1) receiving selected ones of said wheel condition signals,
  (2) independently processing said wheel condition signals received by said second microcontroller means,
  (3) generating said brake pressure signals in response to said wheel condition signals received by said second microcontroller means, (c) said first microcontroller means also for:
  (1) receiving from said second microcontroller means at least one of:
    (i) said selected wheel condition signals received by said second microcontroller means, and
    (ii) said brake pressure signals generated by said second microcontroller means, and
  (2) comparing signals received from said second microcontroller means with corresponding signals received and generated by said first microcontroller means, and
  (3) generating a first monitoring signal as a function of any difference between compared signals, said first monitoring signal being an alternating signal having a predetermined frequency and amplitude whenever the difference between compared signals falls below a predetermined threshold level, and (d) said second microcontroller means also for:
  (1) receiving from said first microcontroller means at least one of:
    (i) said selected wheel condition signals received by said first microcontroller means, and
    (ii) said brake pressure signals generated by said first microcontroller means, and
  (2) comparing signals received from said first microcontroller means with corresponding signals received and generated by said second microcontroller means, and
  (3) generating a second monitoring signal as a function of any difference between compared signals, said second monitoring signal being an alternating signal having a predetermined frequency and amplitude whenever the difference between compared signals falls below a predetermined threshold level, and
and safety circuit means for:
  (a) comparing each of said first and said second monitoring signals with a time standard from at least one clock generator operating independently of an operating cycle of said first microcontroller means and said second microcontroller means, and
  (b) disabling said solenoid valves whenever any of said first and said second monitoring signals exceeds said predetermined threshold level.

2. A circuit according to claim 1 further including a trigger circuit through which said wheel condition signals are conducted to said first and said second microcontroller means and containing a first clock generator for said first monitoring signal operating independently of an operating cycle of said first microcontroller means and a second clock generator for said second monitoring signal operating independently of an operating cycle of said second microcontroller means.

3. A circuit according to claim 2 further including:
  (a) a power supply,
  (b) means for selectively conducting power from said power supply to said solenoid valves to actuate said solenoid valves, and
  (c) valve control means responsive to said safety circuit means for preventing actuation of said solenoid valves.

4. A circuit according to claim 3 further including second valve control means responsive to said safety circuit means for preventing actuation of said solenoid valves.

5. A circuit according to claim 4 further including amplifying means between said first and said second microcontroller means and said solenoid valves, and said second valve control means control said amplifying means.

6. A circuit according to claim 5 further including monitoring circuit means for:
  (a) developing control signals representative of defects in said anti-lock system, and
  (b) supplying said control signals to said first and said second microcontroller means
and wherein said first and said second monitoring signals indicate the presence of said control signals.

7. A circuit according to claim 6 wherein said monitoring circuit means include a parity chain responsive to operation of said solenoid valves and said brake pressure control signals.

8. A circuit according to claim 1 wherein each of said first and said second monitoring signals is compared with a separate time standard from a separate clock generator operating independently of an operating cycle of said first microcontroller means and an operating cycle of said second microcontroller means.

9. A circuit for controlling a vehicle anti-lock system operative to receive wheel condition signals from a plurality of wheel condition sensors and generate brake pressure signals in response thereto to modulate vehicle brake line solenoid valves, said circuit comprising:
signal processing circuit means for:
  (a) receiving said wheel condition signals, and
  (b) generating said brake pressure signals in response to said wheel condition signals,
said signal processing circuit means including:
  (a) first microcontroller means for:
    (1) receiving selected ones of said wheel condition signals,
    (2) independently processing said wheel condition signals received by said first microcontroller means, and
    (3) generating said brake pressure signals in response to said wheel condition signals received by said first microcontroller means, and
  (b) second microcontroller means for:
    (1) receiving selected ones of said wheel condition signals,
    (2) independently processing said wheel condition signals received by said second microcontroller means, and
    (3) generating said brake pressure signals in response to said wheel condition signals received by said second microcontroller means, and
  (c) data exchange means interconnecting said first and said second microcontroller means for exchanging between said first and said second microcontroller means at least one of:
    (1) said selected wheel condition signals, received by said first and said second microcontroller means, and
    (2) said brake pressure signals generated by said first and said second microcontroller means, and
  (d) said first microcontroller means also for:
    (1) comparing signals received from said second microcontroller means with corresponding signals received and generated by said first microcontroller means, and
    (2) generating a first monitoring signal as a function of any difference between compared signals, said first monitoring signal being an alternating signal having a predetermined frequency and amplitude whenever the difference between compared signals falls below a predetermined threshold level,
  (e) said second microcontroller means also for:
    (1) comparing signals received from said first microcontroller means with corresponding signals received and generated by said second microcontroller means, and
    (2) generating a second monitoring signal as a function of any difference between compared signals, said second monitoring signal being an alternating signal having a predetermined frequency and amplitude whenever the difference between compared signals falls below a predetermined threshold level,
and safety circuit means, including at least one clock generator operating independently of an operating cycle of said first microcontroller means and an operating cycle of said second microcontroller means, for:

(a) comparing each of said first and said second monitoring signals with a time standard from said clock generator, and (b) disabling said solenoid valves whenever any of said first and said second monitoring signals exceeds said predetermined threshold level.

10. A circuit according to claim 9 wherein said safety circuit means include two clock generators each operating independently of an operating cycle of said first microcontroller means and an operating cycle of said second microcontroller means and said first monitoring signal is compared with a first time standard from said first clock generator and said second monitoring signal is compared with a second time standard from said second clock generator.

* * * * *